United States Patent [19]

Kustka

[11] 4,344,177
[45] Aug. 10, 1982

[54] EQUALIZER COMPRISED OF EQUALIZER SECTIONS WHICH INCLUDE INTERNAL ACCUMULATION CIRCUITS

[75] Inventor: George J. Kustka, Ocean, N.J.

[73] Assignee: Bell Telephone Laboratories, Incorporated, Murray Hill, N.J.

[21] Appl. No.: 195,367

[22] Filed: Oct. 9, 1980

[51] Int. Cl.³ ............................................. H04L 25/03
[52] U.S. Cl. ....................................... 375/16; 364/724
[58] Field of Search .................... 333/18; 328/117, 159, 328/160; 364/736, 724, 768; 375/12, 13, 14, 16

[56] References Cited

U.S. PATENT DOCUMENTS

| 3,775,685 | 11/1973 | Eggimann et al. | 375/12 |
| 3,868,603 | 2/1975 | Guidoux | 333/18 |
| 4,004,282 | 1/1977 | Weber et al. | 364/200 |
| 4,006,352 | 2/1977 | Sato | 364/724 |
| 4,020,333 | 4/1977 | Nussbaumer | 364/724 |

Primary Examiner—Benedict V. Safourek
Attorney, Agent, or Firm—Ronald D. Slusky

[57] ABSTRACT

A data signal receiver (100) forms line samples of a received modulated data signal and applies them to a fractionally spaced equalizer (150). The equalizer outputs are demodulated and decisions are formed as to the values of the transmitted data symbols. An error signal is also formed. This is used to update the values of coefficients used in the equalizer. The equalizer itself is comprised of a plurality of equalizer sections (220, 240, 260, 280) each of which multiplies ones of the line samples with respective ones of the coefficients to form a partial sum. Each equalizer section includes an internal accumulation circuit (225) which detects the arrival of an applied accumulation input signal and, in response, adds its partial sum thereto to generate an accumulation output signal. The latter serves as the accumulation input signal for another equalizer section. The accumulation output signal of the last equalizer section to receive an accumulation input signal constitutes the overall equalizer output.

5 Claims, 3 Drawing Figures

EQUALIZER COMPRISED OF EQUALIZER SECTIONS WHICH INCLUDE INTERNAL ACCUMULATION CIRCUITS

BACKGROUND OF THE INVENTION

The present invention relates to equalizers such as are used in data receivers.

Much of today's data communication equipment, such as high speed voiceband data sets (modems), are comprised of high-density integrated circuits (ICs). The costs of designing and developing such ICs is relatively high. It is thus desirable that a particular IC design be able to be incorporated into an entire line of products rather than just a single product, thereby distributing the design and development costs over the entire line.

The above considerations apply, in particular, to equalizers which are used in voiceband data sets to correct for such channel-induced distortion as intersymbol interference. In the usual such equalizer, a predetermined number of previously-formed samples of a received data signal, referred to as line samples, are multiplied by respective ones of an ordered plurality, or queue, of coefficients and the resulting products are summed to form the equalizer output. In designing an equalizer which can be used in more than one data set type, account must be taken of the fact that the length of the equalizer (i.e., the number of line samples (or coefficients) which are used to form each equalizer output) may differ for data sets operating at, for example, different bit rates. Advantageously, the requirements of different equalizer lengths can be accommodated by designing an equalizer IC which can be used as a modular building block, with two or more such "equalizer sections" being interconnected in series to provide an overall equalizer of the desired length. A further advantage of this building block approach is that the equalizer sections, or series connections of same, can be arranged in parallel to provide a so-called fractionally spaced equalizer.

SUMMARY OF THE INVENTION

In equalizers of the above-described type, the line sample/coefficient products generated by each equalizer section must be added together to arrive at the overall equalizer output. This function could be performed by accumulation circuitry external to the equalizer sections. Such accumulation circuitry might, for example, receive from each equalizer section the sum of the line sample/coefficient products generated in that section and then add those sums together. Disadvantageously, however, such external accumulation circuitry would add to the bulk and expense of the equalizer.

The present invention, by contrast, is directed to an equalizer in which each equalizer section includes its own internal accumulation circuit. The accumulation circuit within each section combines the line sample/coefficient products generated within that section with a received accumulation input signal to generate an accumulation output signal. The accumulation circuits of the equalizer sections are connected in series so that the accumulation output signal of at least one equalizer section serves as the accumulation input signal for another. The accumulation output signal of the last equalizer section to receive an accumulation input signal constitutes the overall equalizer output.

In preferred embodiments of the invention, the accumulation circuits are self-clocking. In particular, an accumulation circuit detects the arrival of an accumulation input signal applied to it and, in response, begins forming its accumulation output signal. Advantageously, this approach allows any number of equalizer sections to be interconnected in any desired series or parallel configuration while requiring a minimum amount of clocking circuitry.

DETAILED DESCRIPTION

Figure 1:
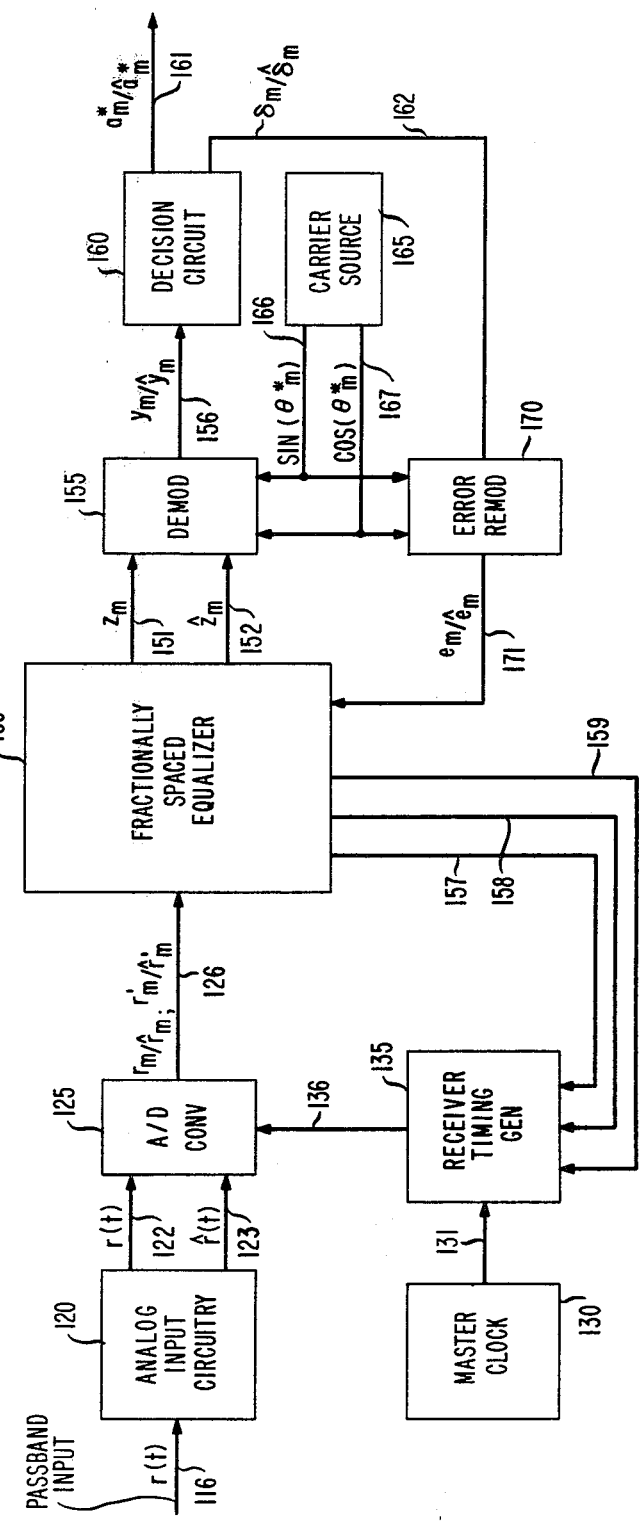
FIG. 1 shows a data signal receiver including an adaptive equalizer in which the present invention is illustratively used.

Receiver 100 shown in FIG. 1 is adapted for use in a voiceband data set, or modem. Although not shown in the FIG., receiver 100 may operate under microprocessor control.

Receiver 100 is illustratively used in a communication system employing quadrature-amplitude modulation (QAM). In particular, four information bits, comprising a so-called data symbol, are communicated once every $T = 1/2400$ sec. The symbol rate is thus 2400 baud, yielding a binary data transmission rate of 9600 bits per second. The four bits to be transmitted are encoded into two signal levels, each of which can take on one of the four values $+1$, $-1$, $+3$, $-3$. The two signal levels amplitude modulate respective 1800 Hz in-phase and quadrature-phase carrier waves which, in combination, comprise the transmitted QAM signal.

The QAM signal, representing a succession of data symbols transmitted at a rate of $1/T$ symbols per second, is received by receiver 100 on lead 116. This passband input signal, $r(t)$, passes to analog input circuitry 120 comprised of a bandpass filter and Hilbert transform circuit. The output of circuitry 120 is comprised of a Hilbert transform pair $r(t)$ and $f(t)$ derived from the received passband signal. These are passed to an A/D converter 125 on leads 122 and 123.

A master clock 130 generates 128 master clock pulses every T seconds on lead 131. These are received by receiver timing generator 135. The latter counts the pulses on lead 131 and generates timing signals on a number of output leads to control the sequencing of the various signal processing functions within the modem. One of these leads shown explicitly is lead 136. The latter extends pulses to A/D converter 125 at a rate which causes A/D converter 125 to generate line samples at p/T samples per second. The parameter p is illustratively equal to 2. A/D converter 125 thus generates two complex passband, i.e., modulated, line samples $R_m$ and $R_m'$ during the $m^{th}$ receiver symbol interval. (An alternative way of generating $R_m$ and $R_m'$ is to first sample and digitize the received signal at a rate at least equal to twice its highest frequency component and then pass the resulting signal through a digital phase-splitter.)

QAM signals are conveniently expressed and processed as complex numbers, each having a real and imaginary component. The real and imaginary components of the line samples formed by A/D converter 125 are provided one after the other in serial form as separate ten-bit digital signals, or words, on lead 126. (Each of the other signal leads similarly carries its signals in serial form.) Notationally, the real and imaginary components of sample $R_m$ are represented as $r_m$ and $\hat{r}_m$. Those of sample $R_m'$ are represented as $r_m'$ and $\hat{r}_m'$.

Line samples $R_m$ and $R_m'$, which are spaced $T/2$ seconds apart, are equalized by fractionally spaced equalizer 150 described hereinbelow. It suffices to say for the present that the outputs of equalizer 150 on leads 151 and 152 are generated once per symbol interval and are, respectively, the real and imaginary components $z_m$ and $\hat{z}_m$ of a passband equalizer output $Z_m$. (It should be noted at this point that, due to processing delay in equalizer 150, passband equalizer output $Z_m$ is not necessarily generated during the $m^{th}$ receiver interval, the latter being defined as the T second interval during which line samples $R_m$ and $R_m'$ are generated. The subscript m in "$Z_m$" thus does not identify when $Z_m$ is generated but, rather, identifies $Z_m$ as being the passband equalizer output which is next generated after line samples $R_m$ and $R_m'$ are applied to the equalizer. Similar considerations apply, for example, to signals $Y_m$, $A_m^*$, $\Delta_m$ and $E_m$ discussed below.)

It may also be noted at this point that equalizer 150 extends timing control signals to receiver timing generator 135 over leads 157–159. The manner in which these control signals may be generated is disclosed in my U.S. patent application, Ser. No. 185,017, filed Sept. 8, 1980.

Passband equalizer output $Z_m$ is demodulated to baseband by demodulator 155. The demodulated output of demodulator 155 is baseband equalizer output $Y_m$. Baseband equalizer output $Y_m$ is hereinafter referred to as equalizer output $Y_m$. It has real and imaginary components $y_m$ and $\hat{y}_m$, provided one after the other as twelve-bit words on lead 156. The demodulation process performed by demodulator 155 is expressed in complex notation as $$Y_m = Z_m e^{-j\theta_m^*}$$

where $\theta_m^*$ is an estimate of the carrier phase. For purposes of generating $Y_m$ in accordance with the above expression, demodulator 155 receives nine-bit digital representations of $\sin(\theta_m^*)$ and $\cos(\theta_m^*)$ on output leads 166 and 167 of carrier source 165.

Components $y_m$ and $\hat{y}_m$ are quantized in decision circuit 160. The resulting outputs, provided one after the other on lead 161, are decisions $a_m^*$ and $\hat{a}_m^*$ as to the signal levels which represent components $a_m$ and $\hat{a}_m$ of a particular transmitted symbol $A_m$. Decisions $a_m^*$ and $\hat{a}_m^*$ can be thought of as the real and imaginary components of a complex decision $A_m^*$.

Decision circuit 160 also provides, on lead 162, the real and imaginary components, $\delta_m$ and $\hat{\delta}_m$, of a complex baseband error signal $\Delta_m$ associated with the data symbol in question. Error signal $\Delta_m$ is equal to the quantity $(Y_m - A_m^*)$. In particular, $\hat{\delta}_m = (\hat{y}_m - \hat{a}_m^*)$ and $\delta_m = (y_m - a_m^*)$, with $\delta_m$ and $\hat{\delta}_m$ being expressed as respective twelve-bit words. Error signal $\Delta_m$ is remodulated in error remodulator 170 to yield a remodulated, or passband, error signal $E_m$ given by $$E_m = \Delta_m e^{+j\theta_m^*}.$$

In order to form the remodulated error signal, remodulator 170, like demodulator 155, receives $\sin(\theta_m^*)$ and $\cos(\theta_m^*)$ from carrier source 165.

(An alternative way of generating error signal $E_m$ would be to remodulate complex decision $A_m^*$ and subtract it from passband equalizer output $Z_m$. In either case, the value of $E_m$ is the same, it being equal to the difference, modulated at the carrier frequency, between the pre- and post-quantized values of equalizer output $Y_m$.)

Real and imaginary components $e_m$ and $\hat{e}_m$ of error signal $E_m$ are extended one after the other to fractionally spaced equalizer 150 on lead 171 for purposes of coefficient updating, as described below.

Figure 2:
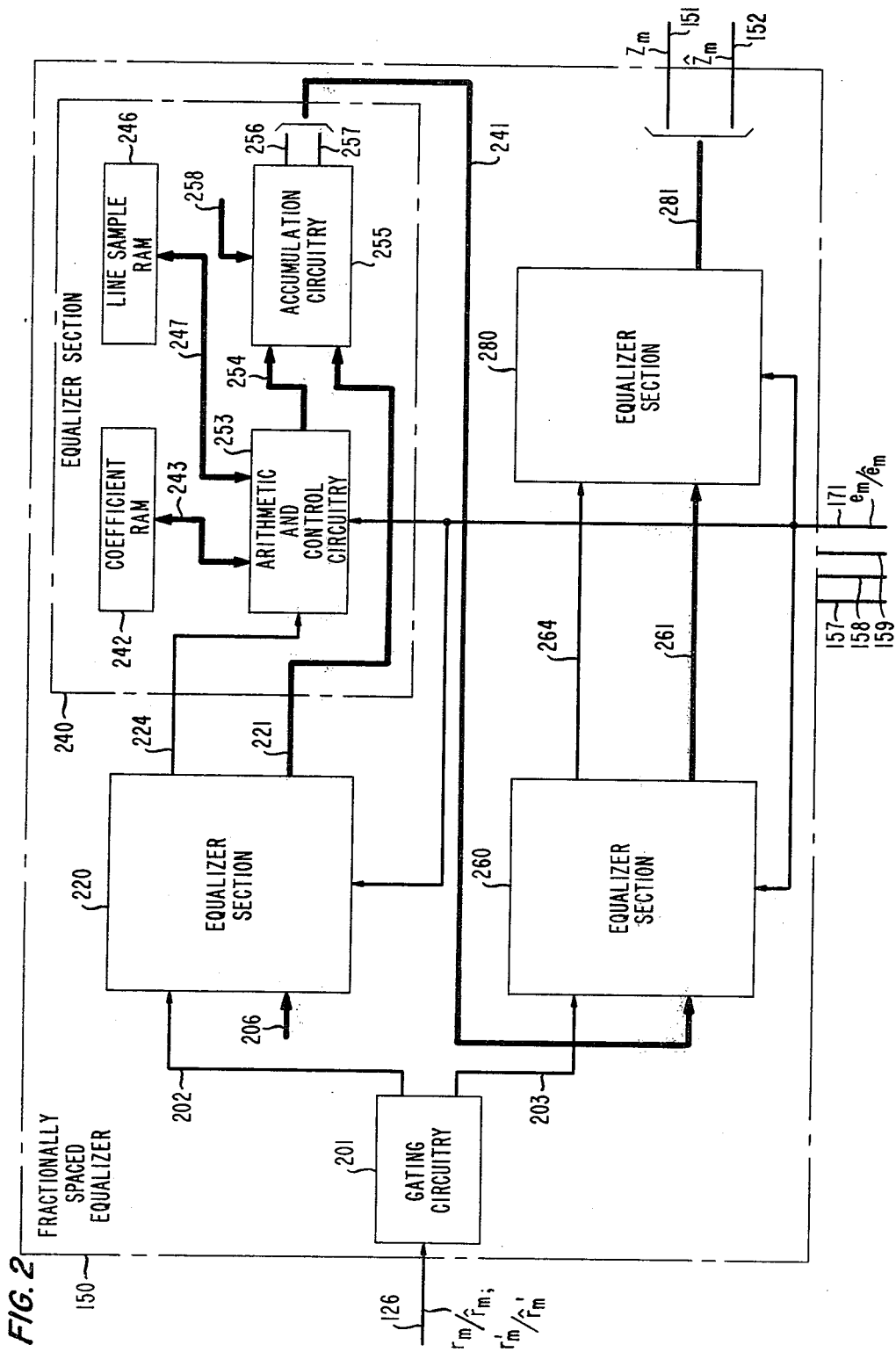
FIG. 2 shows the above-mentioned adaptive equalizer, which is comprised of a plurality of equalizer sections each of which includes accumulation circuitry embodying the principles of the invention.

As shown in FIG. 2, fractionally spaced equalizer 150 is comprised of four substantially identical equalizer sections 220, 240, 260 and 280. Each equalizer section holds at least $(M+d)$ complex line samples, where M is a selected integer, such as 16, and d is no less than the number of symbol intervals which elapse between the generation of line samples $R_m$ and $R_m'$ and the generation of error signal $E_m$. The d extra line samples are needed for coefficient updating, as set forth below. Illustratively, $d=2$.

Equalizer 150 also includes gating circuitry 201, which receives line samples $R_m$ and $R_m'$ on lead 126. The former line sample is held in gating circuitry 201 until the latter line sample is received. Line sample $R_m$ is then extended via lead 202 to equalizer section 220. Line sample $R_m'$ is concurrently extended via lead 203 to equalizer section 260. The oldest samples in equalizer sections 220 and 260—$R_{m-(M+d)}$ and $R'_{m-(M+d)}$—are discarded. In addition, each of equalizer sections 220 and 260 transfers the $M^{th}$ oldest line sample stored therein—$R_{m-M}$ and $R'_{m-M}$, respectively—to equalizer sections 240 and 280 via leads 224 and 264, respectively. Equalizer sections 240 and 280 store these line samples and discard their oldest line samples $R_{m-(2M+d)}$ and $R'_{m-(2M+d)}$, respectively.

For each symbol interval, each of the equalizer sections multiplies the M newest, i.e., most-recently-formed, line samples stored therein by respective complex coefficients stored therein and forms the sum of the resulting products, referred to as a partial sum. The four partial sums are then added together in accordance with the invention, as described below, to form previously described equalizer output $Z_m$.

In particular, equalizer sections 220, 240, 260 and 280 respectively form the partial sums $$\sum_{i=1}^{M} C_i(m) R_{m-i+1}, \quad \sum_{i=M+1}^{2M} C_i(m) R_{m-i+1},$$

$$\sum_{i=1}^{M} C_i'(m) R'_{m-i+1} \text{ and } \sum_{i=M+1}^{2M} C_i'(m) R'_{m-i+1}.$$

In these expressions the $C_i(m)$'s and $C_i'(m)$'s are the above-mentioned complex coefficients. Each coefficient has a particular value associated with the $m^{th}$ receiver symbol interval and, as can be seen from the above expressions, each coefficient is multiplied by a line sample which bears a predetermined temporal relationship to the most recently formed line sample. Thus, for example, coefficient $C_1'(m)$ is always multiplied by the most recently formed line sample $R_m'$; coefficient $C_1(m)$ is always multiplied by the second most recently formed line sample $R_m$, and so on.

In accordance with the invention, as discussed in further detail hereinbelow, equalizer section 220 thereupon transfers the real and imaginary components of its partial sum to section 240 in serial form via separate leads in cable 221. This partial sum constitutes the accumulation output signal of section 220 and the accumulation input signal for section 240. Equalizer section 240 adds the received accumulation input signal to its own partial sum to generate an accumulation output signal which is passed to section 260 via leads within cable 241 and so on. To begin the process, a "dummy" accumulation input signal, equal to zero, is applied to equalizer section 220 (by circuitry not shown) over cable 206. (Since addition is a commutative operation in the absence of arithmetic overflow or saturation, the partial sums generated by the four equalizer sections can be added in any order desired.) The ultimate equalizer output components $z_m$ and $\hat{z}_m$ are provided by section 280 on leads 151 and 152 of a cable 281.

Each equalizer section then updates the coefficient values stored therein to provide coefficient values associated with the $(m+1)^{st}$ symbol interval. The updating rule illustratively used in equalizer sections 220 and 240 is $$C_i(m+1) = C_i(m) - \alpha E_{m-d} R_{m-i-d+1} - \alpha \mu SGN[C_i(m)]$$

and that illustratively used in sections 260 and 280 is $$C_i'(m+1) = C_i'(m) - \alpha E_{m-d} R_{m'-i-d+1} - \alpha \mu SGN[C_i'(m)],$$

where d is as defined above, $\alpha$ and $\mu$ are selected constants, and the value of the complex function SGN[X] is $\pm 1 \pm j$ depending on the signs of the real and imaginary components of its complex argument X. In order to implement these updating rules—which embody the so-called mean-squared updating algorithm, modified in accordance with the tap leakage technique taught in commonly-assigned U.S. patent application of R. D. Gitlin et al, Ser. No. 16,495 filed Mar. 1, 1979, now U.S. Pat. No. 4,237,554 issued Dec. 2, 1980 each equalizer section receives the real and imaginary error signal components $e_m$ and $\hat{e}_m$ provided on lead 171.

By way of example, FIG. 2 shows the constituents of equalizer section 240. Its line samples and coefficients are stored in line sample random access memory (RAM) 246 and coefficient RAM 242, respectively. Except for partial sum accumulation, all the signal processing and control functions within equalizer section 240, including, for example, those related to the generation of partial sums and coefficient updating, are performed by arithmetic and control circuitry 253. Circuitry 253 communicates with RAMs 242 and 246 via cables 243 and 247, respectively. For purposes of coefficient updating, as described above, circuitry 253 receives the error signal on lead 171.

Arithmetic and control circuitry 253 extends the real and imaginary components of the partial sum generated thereby to accumulation circuitry 255 via respective leads within cable 254. Circuitry 255 also receives, via cable 221, the accumulation output signal of equalizer section 220 which, as previously noted, serves as the accumulation input signal for equalizer section 240. Circuitry 255 combines the real (imaginary) components of the signals in cables 254 and 221 to generate on lead 256 (257) of cable 241 the real (imaginary) component of the accumulation output signal of equalizer section 240.

Figure 3:
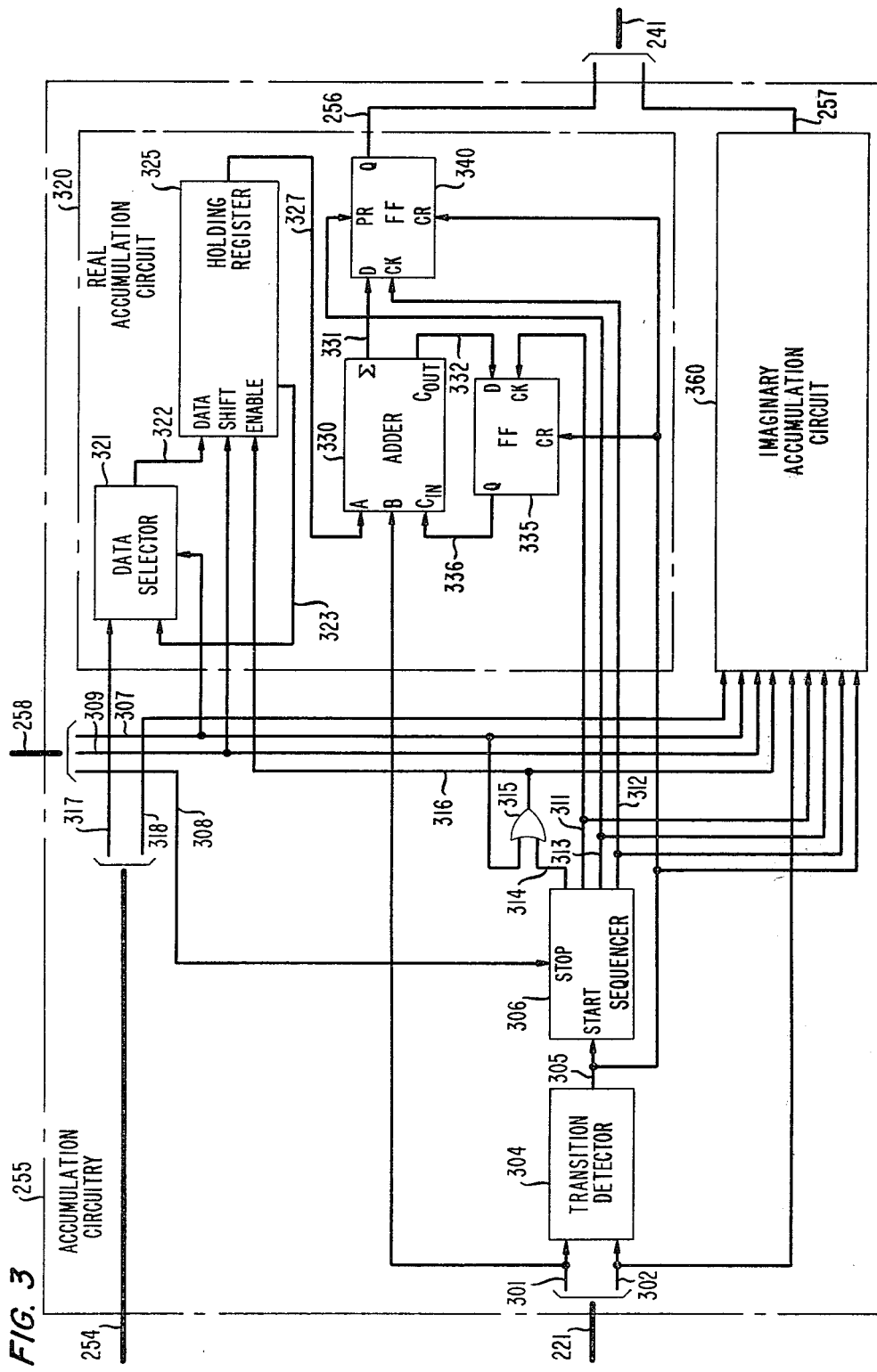
FIG. 3 shows an illustrative realization of the accumulation circuitry.

As shown in FIG. 3, accumulation circuitry 255 illustratively includes real accumulation circuit 320 and imaginary accumulation circuit 360. These circuits are controlled by common control circuitry within accumulation circuitry 255. This includes transition detector 304, sequencer 306 and OR gate 315.

Circuit 320 receives (a) on lead 317 of cable 254 the real component of the partial sum generated by arithmetic and control circuitry 253 (FIG. 2) and (b) on lead 301 of cable 221 the real component of the accumulation output signal of equalizer section 220. Circuit 320 generates on lead 256 of cable 241 the real component of the accumulation output signal of equalizer section 240.

Similarly, circuit 360 receives (a) on lead 318 of cable 254 the imaginary component of the partial sum generated by circuitry 253 and (b) on lead 302 of cable 221 the imaginary component of the accumulation output signal of equalizer section 220. Circuit 360 generates on lead 257 of cable 241 the imaginary component of the accumulation output signal of equalizer component 240.

Circuits 320 and 360 are substantially identical to one another. Only one of them—illustratively circuit 320—is shown and discribed in detail herein.

Circuit 320 illustratively includes data selector 321, holding register 325, adder 330 and D-type flip-flops 335 and 340. At a time prior to the reception of the accumulation input signal on cable 221, a load pulse is provided on a lead 307 of cable 258 by receiver control circuitry (not shown) external to the accumulation circuitry. This pulse causes data selector 321 to pass through to the data input of register 325 via lead 322 twelve serial bits comprising the real component of the partial sum then appearing on lead 317. The bits appear on lead 317 least significant bit first. The load pulse on lead 307 is, at the same time, extended through OR gate 315 via lead 316 to the enable input of register 325, causing it to respond to the next twelve shift pulses provided continuously by the external control circuitry on lead 309 of cable 258 to shift in the data bits on lead 322.

In preferred embodiments, the accumulation circuitry of the present invention is self-clocking. That is, it detects the arrival of an accumulation input signal and, in response, begins forming its accumulation output signal with no further external stimulus. In the present illustrative embodiment, in particular, the accumulation input signal components on leads 301 and 302 always begin with respective, illustratively concurrent, negative transitions. These transitions are detected by transition detector 304 which, in response, generates a pulse on lead 305. This pulse clears flip-flop 340, which was previously preset, thereby generating the negative transition which starts off the real accumulation output signal component on lead 256.

The pulse on lead 305 also clears flip-flop 335, the operation of which is described below. In addition, the pulse on lead 305 initiates the operation of sequencer 306. In particular, the latter begins to generate a train of pulses on lead 314, which are extended to the enable input of register 325 via gate 315 and lead 316. Each pulse on lead 316 windows a shift pulse on lead 309, thereby causing a successive bit stored in register 325 to be shifted out on to lead 327 and thence to the "A" input of adder 330.

The above-mentioned load pulse on lead 307 has terminated by this time. As a consequence, data selector 321 now provides on lead 322 the left-most bit then stored in register 325, which is extended to selector 321 over lead 323. The partial sum component stored in register 325 is illustratively represented in two's complement notation, with the sign bit being the left-most bit. Thus, as the bits of the partial sum component are shifted out onto lead 327, the feeding back of the signal on lead 323 causes successive left-hand locations of the register to fill up with replications of the sign bit. A property of two's complement notation is that such sign bit "extension" has no effect on the value of a number when, for example, it is added to another two's complement number. Extending the sign bit of the partial sum component is advantageous in this application because a received accumulation input signal component will often have more non-sign bits than the partial sum component to which it is added. Thus, no bits are lost when the two components are added together.

As each bit of the real partial sum component appears on lead 327, the corresponding bit of the accumulation input signal is appearing on lead 301 and is extended to the "B" input of adder 330. These two bits are combined with a carry-in ($C_{IN}$) bit provided on lead 336 to generate a sum bit on lead 331 and a carry-out ($C_{OUT}$) bit on lead 332. The sum bit is clocked first into and then out of flip-flop 340 via a clock signal provided by sequencer 306 on lead 312. Flip-flop 340 is provided principally to square up the adder output signal. Its Q output is connected to lead 256.

The carry-out bit on lead 332 is clocked into and then out of flip-flop 335 in response to a clock signal provided by sequencer 306 on lead 311. The Q output of flip-flop 335 is connected to lead 336, thereby providing the carry-in bit to be used in generating the next sum and carry-out bits on leads 331 and 332.

Once the entire real partial sum component, plus some predetermined number of extended sign bits, have been shifted out of register 325, the pulses on lead 314 cease. Sequencer 307 then presets flip-flop 340 via a pulse on lead 313 in order to prepare for the generation of a negative transition on lead 256 at the start of the next accumulation output signal to be generated by circuit 320. A subsequent pulse, provided on lead 308 of cable 258 by the external control circuitry, halts the operation of sequencer 306.

The foregoing merely illustrates the principles of the invention. For example, the invention is applicable to both passband and baseband equalizers and to both baud and fractionally spaced equalizers. It will thus be appreciated that those skilled in the art will be able to devise various arrangements which, although not specifically shown or described herein, embody the principles of the invention and which, therefore, do not depart from their spirit and scope.

I claim:

1. An equalizer comprised of at least first and second equalizer sections, each of said equalizer sections being adapted to multiply each of a plurality of line samples with respective coefficients to form a plurality of products, said first equalizer section including means for generating an accumulation signal which represents the sum of the products formed in said first equalizer section and means for applying said accumulation signal to said second equalizer section, said second equalizer section including means operative for combining the products formed in said second equalizer section with said accumulation signal and means for initiating the operation of said combining means in response to receipt by said second equalizer section from said first equalizer section of said accumulation signal.

2. The invention of claim 1 wherein said generating means provides said accumulation signal with an initial signal transition of a predetermined polarity and wherein said initiating means initiates said operation in response to said transition.

3. An equalizer comprised of a plurality of equalizer sections, each of said equalizer sections being adapted to generate a partial sum signal which is to be combined with the partial sum signal generated by each of the other equalizer sections, each equalizer section including means for receiving an accumulation input signal, means operative for combining said accumulation input signal with the partial sum signal generated in said each equalizer section to generate an accumulation output signal and means for initiating the operation of said combining means in response to the receipt of said accumulation input signal, said equalizer being further comprised of means for applying the accumulation output signals of at least ones of said equalizer sections to respective others of said equalizer sections as the latters' accumulation input signals.

4. The invention of claim 3 wherein said each equalizer section further includes means for generating said partial sum signal by combining the products of each of a plurality of line samples with a respective coefficient.

5. The invention of claims 3 or 4 further comprised of means for applying to one of said equalizer sections an accumulation input signal whose value is zero.

* * * * *